United States Patent
Nasu et al.

(10) Patent No.: US 6,560,051 B1
(45) Date of Patent: May 6, 2003

(54) DISK DEVICE HAVING ACCESS TO DISK IN DIFFERENT WRITING MODES

(75) Inventors: Masahiro Nasu, Fukushima-ken (JP); Kyoichi Shirane, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/512,000

(22) Filed: Feb. 24, 2000

(30) Foreign Application Priority Data

Feb. 25, 1999 (JP) .............................................. 11-047938

(51) Int. Cl.⁷ ................................................. G11B 5/00
(52) U.S. Cl. ................................. 360/8; 360/61; 360/69
(58) Field of Search ............................. 360/31, 40, 30, 360/29, 48, 61, 69, 8, 68; 369/47.36, 47.37, 47.3, 47.52, 53.1, 53.37, 53.45

(56) References Cited

U.S. PATENT DOCUMENTS 4,882,639 A    11/1989  Nasu et al.
5,329,510 A  *  7/1994  Tsuyuguchi et al. .......... 360/25

* cited by examiner

Primary Examiner—Alan T. Faber
(74) Attorney, Agent, or Firm—Brinks Hofer Gilson & Lione

(57) ABSTRACT

A disk device having access to a disk in different writing modes includes a host PC. The host PC sends a command including a data transfer rate to a controller (disk drive). When the command designating the data transfer rate is received, the writing mode employed for writing data to a disk is automatically switched. The host PC already has the transfer rate to be sent. It is unnecessary to newly prepare a special command to notify the controller in order for switching between the writing modes. Therefore, versatility will not be impaired.

4 Claims, 2 Drawing Sheets

DISK DEVICE HAVING ACCESS TO DISK IN DIFFERENT WRITING MODES

BACKGROUND OF THE INVENTION

1. Field of the Invention

The present invention relates to a disk device for reading a signal from or writing a signal to a disk using, for example, magnetism. In particular, the present invention relates to a disk device having access to a disk in different writing modes.

2. Description of the Related Art

A disk device, into which a flexible magnetic disk is loaded as a medium, includes a rotational driver for rotating a disk, a magnetic head, and a head transfer unit for transferring the magnetic head along the disk. The disk device further includes a CPU, buffer memory, and a controller including a generator for generating data to be written and a decoder. Data to be written, which is supplied from a host computer, is initially stored in the buffer memory. Subsequently, the data is formatted by the generator and is written to the disk using the magnetic head. A signal read from the disk using the magnetic head is decoded by the decoder. The decoded signal is first stored in the buffer memory and then transferred to the host computer.

The magnetic disk used herein is a low-capacity type, such as a 1 MB or 2 MB disk.

Writing modes for a low-capacity disk device include a modified frequency modulation (MFM) mode and a frequency modulation (FM) mode. A disk device is specified for either of the writing modes.

The MFM mode is a writing mode mainly used for a low-capacity magnetic disk of 1 MB or 2 MB. The two writing modes differ in output units for outputting clock bits. In the MFM mode, the cycle of a bit cell is half of that of the FM mode. The writing density of the MFM mode is twice that of the FM mode.

The rotational driver of the disk device includes a motor for rotating the magnetic disk. The rotation rate of the motor is set to be, for example, 360 rotations/minute (rpm) or 300 rpm.

The above conventional disk device is specified for either the MFM mode or the FM mode. Compatible operations, such as writing of data by the MFM-mode disk device in the FM mode, are not feasible using the conventional disk device.

If a single disk device is to write data in both the MFM mode and the FM mode, a host computer is required to send a command to the disk device, prior to writing to the disk, permitting discrimination between the MFM mode and the FM mode. Based on the command, the controller of the disk device switches between the writing modes. Since the specification of an interface in general use cannot cope with the above command, a special interface is required to be formed.

An interface connecting a general disk device and a host computer is based on, for example, the AT attachment packet interface (ATAPI) or the small computer system interface (SCSI), so as to be shared with another disk device. Since the MFM mode and the FM mode do not exist in the above interfaces, it is necessary to build a special interface specified to generate and control a special command that designates the writing mode, i.e., the MFM mode or the FM mode.

SUMMARY OF THE INVENTION

Accordingly, it is an object of the present invention to provide a disk device for eliminating or reducing the above problems. The disk device of the present invention automatically switches between writing modes using a command based on a general interface specification without using a special command.

According to one aspect of the present invention, there is provided a disk device including a rotational driver for rotatably-driving a disk, a head for writing a signal to the disk, a head transfer unit for transferring the head along the surface of the disk, and a controller for causing the head to perform writing to the disk in different writing modes. The controller switches between the writing modes based on a command signal of a data transfer rate supplied from a host computer.

As described above, the command signal (command) of the data transfer rate may be used to enable the disk device to automatically switch between the writing modes for the disk. The command designating the transfer rate includes a general command that the host computer already possesses. It is unnecessary to provide the host computer with-a program for generating a special command for switching between the writing modes. A special interface specification is also unnecessary.

The controller may transfer information on the rotation rate of the disk driven by the rotational driver to the host computer. The host computer may compute a command signal value of the data transfer rate to be supplied for switching between the writing modes based on the information on the rotation rate. Then, the writing modes may be switched based on the computed command signal value of the transfer rate.

Even when a motor forming the rotational driver of the disk device rotates at a rotation rate other than a predetermined 300 rpm or 360 rpm, the transfer rate in accordance with the rotation rate may be computed and then notified to the disk device. When the disk device arbitrarily increases the rotation rate in order to, for example, improve the transfer speed, the disk device may be notified of the transfer rate in accordance with the rotation rate and therefore appropriately switches between the writing modes without making an erroneous determination.

For example, the different writing modes include an FM mode and an MFM mode.

The controller provided in the disk device is set to drive and control the overall disk device by operations in accordance with the FM mode and the MFM mode. Based on the command signal of the data transfer rate from the host computer, the controller switches to control in the FM writing operation or the MFM writing operation.

For example, if a disk device is capable of employing both a low-capacity medium accessible in the writing modes of the FM mode and the MFM mode and a high-capacity medium accessible in writing modes other than those of the low-capacity medium, the disk device may automatically switch between the FM mode and the MFM mode by designating the transfer rate.

The switching control of the writing modes is not limited to the switching between the FM mode and the MFM mode, and alternatively, it may be used for switching between other writing modes. The disk is not limited to a flexible magnetic disk, and alternatively, it may be an optical disk or a magneto-optical disk. Specifically, the present invention is applicable to general disk devices capable of writing in modes with different data transfer rates.

DESCRIPTION OF THE PREFERRED EMBODIMENT

Figure 1:
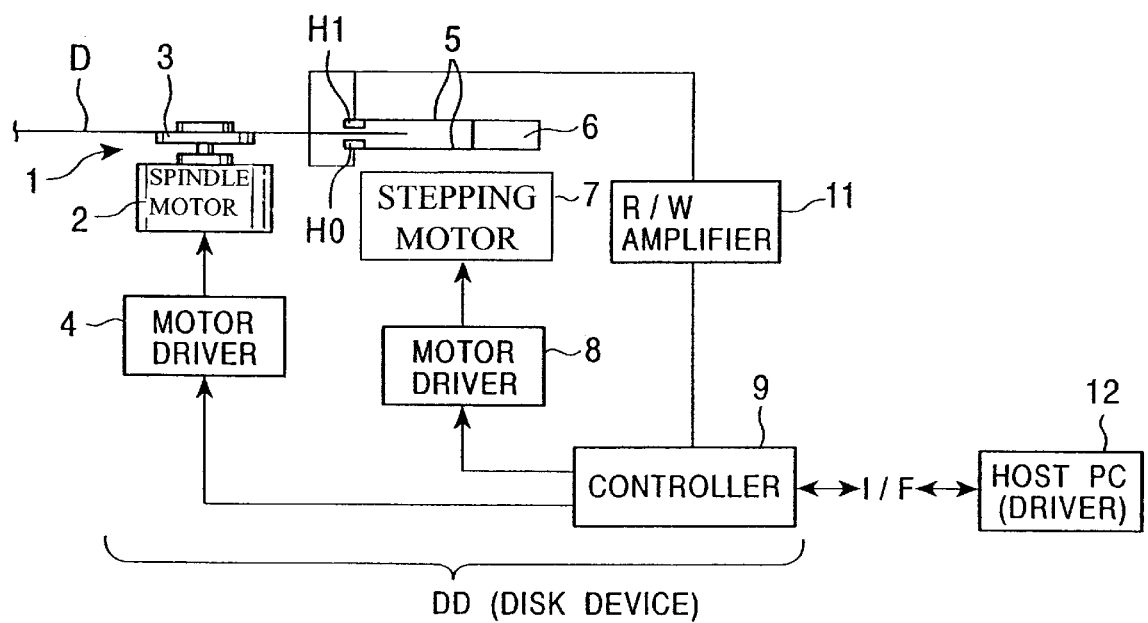
FIG. 1 is a circuit diagram of a disk device according to an embodiment of the present invention.
Figure 2:
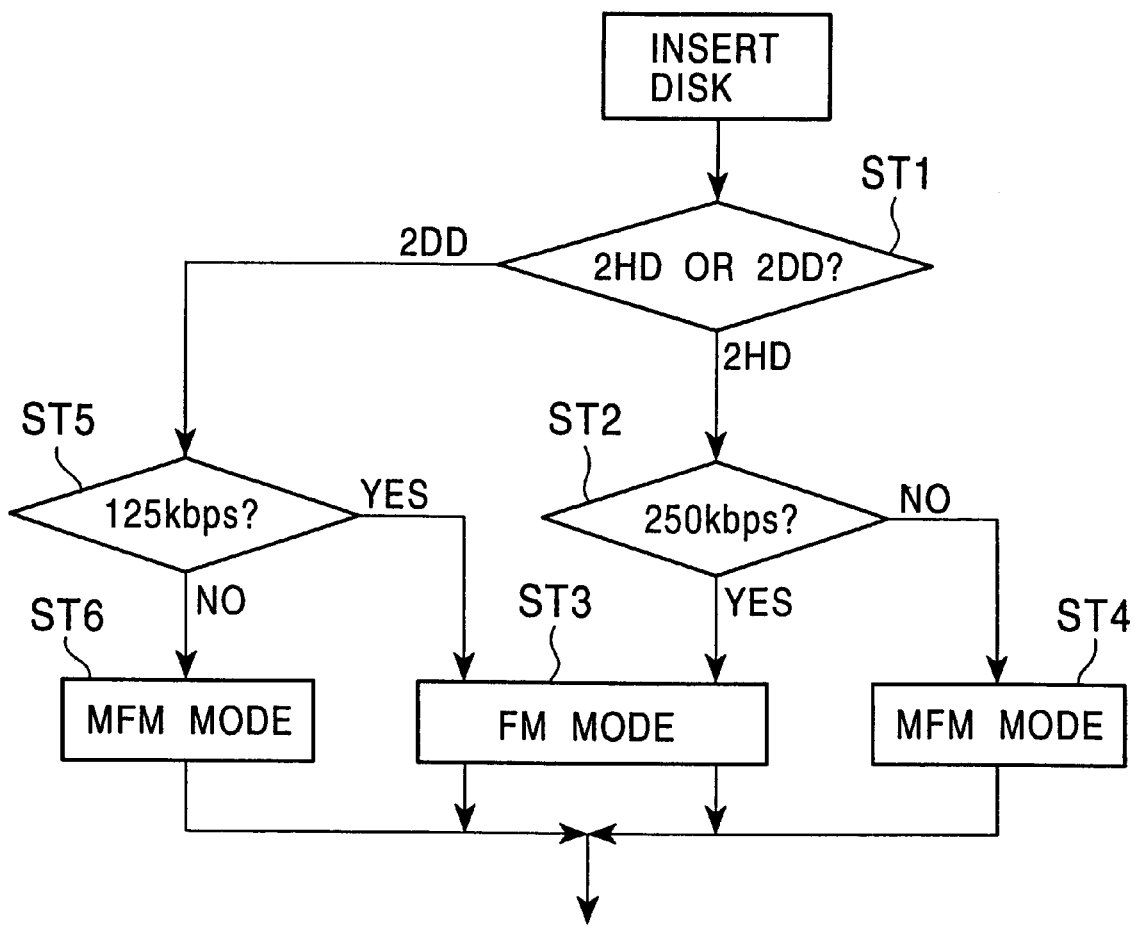
FIG. 2 is a flowchart for describing a process for switching between writing modes.

The present invention is described with reference to the accompanying drawings. FIG. 1 is a circuit diagram of a disk device according to an embodiment of the present invention. FIG. 2 is a flowchart for describing a process for switching writing modes.

A disk device shown in FIG. 1 includes, for example, a flexible magnetic disk, to which signals in both an MFM writing mode and an FM writing mode can be written.

For a pulse string (bit cell) of consecutive data signals formed of zeros and ones, the MFM writing mode outputs a data bit at the center of the bit cell only when one is output as a data signal. The MFM writing mode outputs a clock bit at the head of the second bit cell onward only when data bits of zeros are consecutively output.

The FM mode, which is used by some computers, is an older writing mode than the MFM mode. For a pulse string (bit cell) of consecutive data signals formed of zeros and ones, the FM mode outputs a data bit at the center of the bit cell only when one is output as a data signal. The FM mode always outputs a clock bit at the head of the bit cell.

Accordingly, the MFM writing mode accomplishes a data transfer rate twice as fast as that of the FM writing mode.

As shown in FIG. 1, a rotational driver 1 includes a turntable 3 rotatably-driven by a spindle motor 2. The center of a disk D is clamped on the turntable 3. The disk D is, for example, a low-capacity flexible disk. The disk D is inserted from the outside into the disk device to be mounted on the rotational driver 1. The spindle motor 2 is driven and controlled by a motor driver 4.

A magnetic head H0 opposing a side #0 of the disk D and a magnetic head H1 opposing a side #1 of the disk D are supported by a support arm 5 on a head base 6. The head base 6 is driven in the radial direction of the disk D by a stepping motor 7 forming a head transfer unit. The stepping motor 7 is driven and controlled by a motor driver 8.

The motor drivers 4 and 8 are driven and controlled by control signals from a controller 9.

The magnetic heads H0 and H1 are connected to a read/write (R/W) amplifier 11. The controller 9 is connected to a host computer (host PC) 12 through an input/output interface (I/F). A write signal supplied from the host PC 12 is formatted by the controller 9, and is supplied to the heads H0 and H1 through the R/W amplifier 11. A signal read from the disk D using the heads H1 and H0 is supplied to the controller 9 through the R/W amplifier 11. The signal is then decoded and supplied to the host PC 12.

Specifically, the controller 9 includes buffer memory for storing data to be transferred to/from the host computer 12, a generator for formatting data to be written in accordance with a writing mode and then generating the data to be written, and a decoder for decoding a signal read from a disk.

The host PC 12 includes a built-in device driver. The device driver controls the host PC 12 using an operating system (OS) and applications provided in the host PC 12.

FIG. 2 shows a flowchart describing a process when a low-capacity flexible disk, which is double-sided double-density (2DD) or double-sided high-density (2HD), is loaded into the disk device.

When the disk D is loaded into the disk device, it is determined which type is loaded, either 2HD or 2DD (step ST1). The determination is made by detecting an identification hole of a disk cartridge using a detection switch in the disk device. In step ST1, if it is determined that the loaded disk D is the 2HD type, in step ST2, the process waits for a command (command signal) that designates a data transfer rate (in units of bps) from the host PC 12, and confirms whether the data transfer rate is 250 kbps. If the confirmation is affirmative, the FM mode is employed (step ST3). If the confirmation is negative in step ST2, i.e., if the transfer rate is other than 250 kpbs (for example, 500 kbps), the MFM mode is employed (step ST4).

In step ST1, if the loaded disk D is the 2DD type, in step ST5, the process waits for a command that designates a data transfer rate from the host PC 12, and confirms whether the transfer rate is 125 kbps. If the confirmation is affirmative, the FM mode is employed (step ST3). If the confirmation is negative in step ST5, i.e., if the transfer rate is other than 125 kbps (for example, 250 kbps), the MFM mode is employed (step ST6).

As described above, the controller 9 in the disk device determines the type of the disk D. The controller 9 discriminates between the MFM mode and the FM mode for each disk D by confirming the designated value of the transfer rate, i.e., either 250 kbps or 500 kbps in the case of the 2HD type, or either 125 kbps or 250 kbps in the case of the 2DD type. In accordance with the discrimination, the control flow by the controller 9 is switched to writing control of the MFM mode or to writing control of the FM mode. In accordance with the switching, the disk device writes data to the disk D in the MFM mode or the FM mode.

When the rotation rate of the spindle motor 2, i.e., the rotation rate of the disk D, is other than the predetermined 300 rpm or 360 rpm, the transfer rate for the 2HD-type disk in the FM mode will not be 250 kbps. This indicates that determination based only on the numeric value of a transfer rate may be incorrect. In order to eliminate or minimize the determination inaccuracy, a sensor (not shown) may be provided to detect the rotation rate of the spindle motor 2. The controller 9 notifies the detected rotation rate to the host PC 12. Taking into consideration the notified rotation rate, the host PC 12 computes the optimum value of the transfer rate and notifies the computed transfer rate to the controller 9. Accordingly, the controller 9 can correctly select the proper writing mode based on the rotation rate of the spindle motor 2 and the notified transfer rate.

Data from the disk D can be initially read in a predetermined mode designated by the host, and, if an error occurs, another writing mode may be employed to read the data.

The disk device of the present invention may be applied to a disk device compatible with the above low-capacity disk and a high-capacity disk.

In such a case, the writing modes, including the MFM mode and the FM mode, can be automatically switched by designating a general command, such as a transfer rate command, or a transfer rate command which takes into consideration the rotation rate of a disk, without using a special command for these writing modes.

It should be understood that the present invention is not limited to the disk device for the writing modes of the FM mode and the MFM mode, and is applicable to a switching device for other writing modes. Alternatively, the present invention may be applied to a disk device for another magnetic disk or an optical disk as long as it is applicable.

What is claimed is:

1. A disk device comprising:

a rotational driving mechanism for driving a disk;

a head operative to write a signal to the disk;

a control mechanism causing said head to perform writing to a disk in different writing modes;

wherein said control mechanism switches between the different writing modes as determined from a command signal of a data transfer rate supplied from a host computer;

said control mechanism transfers information on the rotation rate of the disk driven by said rotational driver to the host computer; and the host computer computes a command signal value of the data transfer rate to be supplied for switching between the different writing modes as determined from the information on the rotation rate.

2. A disk device according to claim 1, wherein:

the different writing modes are switched as determined from the computed command signal value of the transfer rate.

3. A disk device according to claim 1, wherein the different writing modes include an FM mode and an MFM mode.

4. A disk device according to claim 2, wherein the different writing modes include an FM mode and an MFM mode.

* * * * *